(12) United States Patent
Foulds et al.

(10) Patent No.: US 8,351,508 B1
(45) Date of Patent: Jan. 8, 2013

(54) MULTITHREADED DESCRIPTOR BASED MOTION ESTIMATION/COMPENSATION VIDEO ENCODING/DECODING

(75) Inventors: Christopher T. Foulds, Austin, TX (US); Timothy R. Cahalan, Austin, TX (US); Moinul H. Khan, Austin, TX (US); Anitha Kona, Austin, TX (US)

(73) Assignee: Marvell International Ltd., Hamilton (BM)

( * ) Notice: Subject to any disclaimer, the term of this patent is extended or adjusted under 35 U.S.C. 154(b) by 1063 days.

(21) Appl. No.: 12/331,866

(22) Filed: Dec. 10, 2008

Related U.S. Application Data

(60) Provisional application No. 61/007,068, filed on Dec. 11, 2007.

(51) Int. Cl.
*H04N 7/12* (2006.01)
(52) U.S. Cl. ......... 375/240.16; 375/240.12; 375/240.23; 375/240.24; 375/240.25; 375/240.26
(58) Field of Classification Search ............. 375/240.12, 375/240.16, 240.23–26
See application file for complete search history.

(56) References Cited

U.S. PATENT DOCUMENTS

| | | | |
|---|---|---|---|
| 2004/0028141 A1* | 2/2004 | Hsiun et al. | 375/240.25 |
| 2004/0179599 A1* | 9/2004 | Lakshmanan et al. | 375/240.12 |
| 2005/0093820 A1* | 5/2005 | Suen | 345/156 |
| 2005/0119870 A1* | 6/2005 | Hosogi et al. | 703/15 |
| 2005/0123057 A1* | 6/2005 | MacInnis et al. | 375/240.25 |
| 2006/0176955 A1* | 8/2006 | Lu et al. | 375/240.03 |
| 2007/0153907 A1* | 7/2007 | Mehta et al. | 375/240.24 |

* cited by examiner

*Primary Examiner* — Sath V Perungavoor
*Assistant Examiner* — James Pontius

(57) ABSTRACT

Systems and methods are provided for calculating a motion vector for a macroblock between a reference frame and a current frame. The system includes a main processor. The system further includes a programmable video accelerator configured to receive a linked list of variable length descriptor inputs at the direction of the main processor. The descriptor inputs include the macroblock for which the motion vector is to be calculated. The video accelerator is further configured to calculate a motion vector identifying motion of the identified macroblock from the reference frame to the current frame.

28 Claims, 16 Drawing Sheets

| ADDRESS OFFSET | BITS | NAME | DESCRIPTION |
|---|---|---|---|
| 0 | 2:0 | ENC_REF_ID | THE FRAME ID FOR THE REFERENCE FRAME THE ME WILL BE OPERATING ON. THIS WILL BE USED FOR BLOCK CACHE REQUESTS AS A MEANS OF DISTINGUISHING BETWEEN THE MULTIPLE REFERENCE FRAMES IN THE FRAME STORE MEMORY. |
| 1 | 15:8 | CURR_LOC_Y | THE Y LOCATION OF THE CURRENT MB IN THE FRAME, IN BLOCKS. |
| 1 | 7:0 | CURR_LOC_X | THE X LOCATION OF THE CURRENT MB IN THE FRAME, IN BLOCKS. |
| 2 | 15:7 | PRED_MV_Y | THE Y PREDICTED MOTION VECTOR, 8 BITS, SIGNED. USED FOR THE IME. |
| 2 | 7:0 | PRED_MV_X | THE X PREDICTED MOTION VECTOR, 8 BITS, SIGNED. USED FOR THE IME. |
| 3 | 31:0 | LUMA_INPUT_DATA_ADDR | THE STARTING ADDRESS POINTER TO WHERE THE ME'S LUMA SOURCE DATA WILL BE READ FROM. |
| 4 | 31:0 | CR_INPUT_DATA_ADDR | THE STARTING ADDRESS POINTER TO WHERE THE ME'S CHROMA RED SOURCE DATA WILL BE READ FROM. |

Fig. 6A

| | | | |
|---|---|---|---|
| 5 | 31:0 | CB_INPUT_DATA_ADDR | THE STARTING ADDRESS POINTER TO WHERE THE ME'S CHROMA BLUE SOURCE DATA WILL BE READ FROM. |
| 6 | 31:0 | LUMA_OUTPUT_DATA_ADDR | THE STARTING ADDRESS POINTER TO WHERE THE LUMA RESIDUAL DATA WILL BE WRITTEN TO. |
| 7 | 31:0 | CR_OUTPUT_DATA_ADDR | THE STARTING ADDRESS POINTER TO WHERE THE CHROMA RED RESIDUAL DATA WILL BE WRITTEN TO. |
| 8 | 31:0 | CB_OUTPUT_DATA_ADDR | THE STARTING ADDRESS POINTER TO WHERE THE CHROMA BLUE RESIDUAL DATA WILL BE WRITTEN TO. |
| 9 | 9 | ENC_DESC_HALT | HALT DESCRIPTOR CHAIN FLAG, MUST WRITE TO THE ME_START BIT TO RESUME |
| 9 | 8 | ENC_DESC_END | END OF DESCRIPTOR CHAIN INDICATION |
| 9 | 7:0 | ENC_IN_NEXT_LEN | NEXT DECRIPTOR LENGTH (IN BYTES) |
| 10 | 31:0 | ENC_IN_NEXT_ADDR | NEXT DESCRIPTOR ADDRESS |

*Fig. 6B*

| ADDRESS OFFSET | BITS | NAME | DESCRIPTION |
|---|---|---|---|
| 0 | 15:8 | CURR_LOC_Y | THE Y LOCATION OF THE CURRENT MB IN THE FRAME, IN BLOCKS. |
| 0 | 7:0 | CURR_LOC_X | THE X LOCATION OF THE CURRENT MB IN THE FRAME, IN BLOCKS. |
| 3 | 9:8 | SB_TYPE3 | THE SUB BLOCK TYPE, WHICH WILL BE 1 OF 4 TYPES. USED ONLY FOR MB TYPES OF 2'b11 (4-8X8 BLOCKS). THIS WILL BE FOR BLOCK 3, WHICH IS THE BOTTOM RIGHT CORNER 8X8 BLOCK OF THE MB.<br>2'b00 - 1-8X8 SUB-BLOCK<br>2'b01 - 2-4X8 SUB-BLOCKS<br>2'b10 - 2-8X4 SUB-BLOCKS<br>2'b11 - 4-4X4 BLOCKS |
| 3 | 7:6 | SB_TYPE2 | THE SUB BLOCK TYPE, WHICH WILL BE 1 OF 4 TYPES. USED ONLY FOR MB TYPES OF 2'b11 (4-8X8 BLOCKS). THIS WILL BE FOR BLOCK 2, WHICH IS THE BOTTOM LEFT CORNER 8X8 BLOCK OF THE MB.<br>2'b00 - 1-8X8 SUB-BLOCK<br>2'b01 - 2-4X8 SUB-BLOCKS<br>2'b10 - 2-8X4 SUB-BLOCKS<br>2'b11 - 4-4X4 BLOCKS |
| 3 | 5:4 | SB_TYPE1 | THE SUB BLOCK TYPE, WHICH WILL BE 1 OF 4 TYPES. USED ONLY FOR MB TYPES OF 2'b11 (4-8X8 BLOCKS). THIS WILL BE FOR BLOCK 1, WHICH IS THE TOP RIGHT CORNER 8X8 BLOCK OF THE MB.<br>2'b00 - 1-8X8 SUB-BLOCK<br>2'b01 - 2-4X8 SUB-BLOCKS<br>2'b10 - 2-8X4 SUB-BLOCKS<br>2'b11 - 4-4X4 BLOCKS |

Fig. 8A

| | | | |
|---|---|---|---|
| 3 | 3:2 | SB_TYPE0 | THE SUB BLOCK TYPE, WHICH WILL BE 1 OF 4 TYPES. USED ONLY FOR MB TYPES OF 2'b11 (4-8X8 BLOCKS). THIS WILL BE FOR BLOCK 0, WHICH IS THE TOP LEFT CORNER 8X8 BLOCK OF THE MB. 2'b00 - 1-8X8 SUB-BLOCK 2'b01 - 2-4X8 SUB-BLOCKS 2'b10 - 2-8X4 SUB-BLOCKS 2'b11 - 4-4X4 BLOCKS |
| 3 | 1:0 | MB_TYPE | THE MACROBLOCK PARTITION, WILL BE ONE OF 4 MB TYPES 2'b00 - 1-16X16 BLOCK 2'b01 - 2-8X16 BLOCKS (WILL NOT BE ALLOWED) 2'b10 - 2-16X8 BLOCKS (WILL NOT BE ALLOWED) 2'b11 - 4-8X8 BLOCKS |
| 4-19 | 31:16 | MV_Y | Y MOTION VECTOR, 16 BITS SIGNED (16 TOTAL) |
| 4-19 | 15:0 | MV_X | X MOTION VECTOR, 16 BITS SIGNED (16 TOTAL) |
| 20 | 31:16 | WIN_SAD | THE COST OF THE WINNING IME MB, UNSIGNED |
| 20 | 15:0 | WIN_COST | THE COST OF THE WINNING IME MB, UNSIGNED |
| 21 | 31:0 | LUMA_OUTPUT_DATA_ADDR | THE STARTING ADDRESS POINTER TO WHERE THE ME'S LUMA RESIDUAL DATA WILL BE WRITTEN TO. |
| 22 | 31:0 | CR_OUTPUT_DATA_ADDR | THE STARTING ADDRESS POINTER TO WHERE THE ME'S CHROMA RED RESIDUAL DATA WILL BE WRITTEN TO. |
| 23 | 31:0 | CB_OUTPUT_DATA_ADDR | THE STARTING ADDRESS POINTER TO WHERE THE ME'S CHROMA BLUE RESIDUAL DATA WILL BE WRITTEN TO. |
| 24 | 8 | ENC_OUT_PACK_END | END OF OUTPUT PACKET CHAIN INDICATION |
| 24 | 7:0 | ENC_OUT_NEXT_LEN | NEXT PACKET LENGTH (IN BYTES) |
| 25 | 31:0 | ENC_OUT_NEXT_ADDR | NEXT PACKET ADDRESS |

*Fig. 8B*

| ADDRESS OFFSET | BITS | NAME | DESCRIPTION |
|---|---|---|---|
| 0 | 11:9 | DEC_REF_ID_3 | THE DECODER REFERENCE FRAME ID FOR THE FRAME THE ID WILL BE OPERATING ON. THIS WILL BE USED FOR BLOCK CACHE REQUESTS AS A MEANS OF DISTINGUISHING BETWEEN THE MULTIPLE DECODER REFERENCE FRAMES IN THE FRAME STORE MEMORY. THIS FRAME MEMORY WILL BE USED FOR BLOCK 3, WHICH IS THE BOTTOM RIGHT 8X8 BLOCK PARTITION, WHEN SUCH PARTITIONS ARE VALID. THIS FIELD IS VALID ONLY FOR MB PARTITION OF 3. |
| 0 | 8:6 | DEC_REF_ID_2 | THE DECODER REFERENCE FRAME ID FOR THE FRAME THE ID WILL BE OPERATING ON. THIS WILL BE USED FOR BLOCK CACHE REQUESTS AS A MEANS OF DISTINGUISHING BETWEEN THE MULTIPLE DECODER REFERENCE FRAMES IN THE FRAME STORE MEMORY. THIS FRAME MEMORY WILL BE USED FOR BLOCK 2, WHICH IS THE BOTTOM LEFT 8X8 BLOCK PARTITION, WHEN SUCH PARTITIONS ARE VALID. THIS FIELD IS VALID ONLY FOR MB PARTITION OF 3. |
| 0 | 5:3 | DEC_REF_ID_1 | THE DECODER REFERENCE FRAME ID FOR THE FRAME THE ID WILL BE OPERATING ON. THIS WILL BE USED FOR BLOCK CACHE REQUESTS AS A MEANS OF DISTINGUISHING BETWEEN THE MULTIPLE DECODER REFERENCE FRAMES IN THE FRAME STORE MEMORY. THIS FRAME MEMORY WILL BE USED FOR BLOCK 1, WHICH IS THE TOP RIGHT 8X8 BLOCK PARTITION, WHEN SUCH PARTITIONS ARE VALID. THIS FIELD IS VALID ONLY FOR MB PARTITION OF 3. |

Fig. 9A

| | | | |
|---|---|---|---|
| 0 | 2:0 | DEC_REF_ID_0 | THE DECODER REFERENCE FRAME ID FOR THE FRAME THE ID WILL BE OPERATING ON. THIS WILL BE USED FOR BLOCK CACHE REQUESTS AS A MEANS OF DISTINGUISHING BETWEEN THE MULTIPLE DECODER REFERENCE FRAMES IN THE FRAME STORE MEMORY. THIS FRAME MEMORY WILL BE USED FOR BLOCK 0, WHICH IS THE TOP LEFT 8X8. IF WE HAVE MB PARTITIONS OF 0, 1, OR 2 THEN REF_ID_0 WILL BE USED. |
| 1 | 15:8 | CURR_LOC_Y | THE Y LOCATION OF THE CURRENT MB IN THE FRAME, IN BLOCKS. |
| 1 | 7:0 | CURR_LOC_X | THE X LOCATION OF THE CURRENT MB IN THE FRAME, IN BLOCKS. |
| 2 | 9:8 | SB_TYPE3 | THE SUB BLOCK TYPE, WHICH WILL BE 1 OF 4 TYPES. USED ONLY FOR MB TYPES OF 2'b11 (4-8X8 BLOCKS). THIS WILL BE FOR BLOCK 3, WHICH IS THE BOTTOM RIGHT CORNER 8X8 BLOCK OF THE MB.<br>2'b00 - 1-8X8 SUB-BLOCK<br>2'b01 - 2-4X8 SUB-BLOCKS<br>2'b10 - 2-8X4 SUB-BLOCKS<br>2'b11 - 4-4X4 BLOCKS |
| 2 | 7:6 | SB_TYPE2 | THE SUB BLOCK TYPE, WHICH WILL BE 1 OF 4 TYPES. USED ONLY FOR MB TYPES OF 2'b11 (4-8X8 BLOCKS). THIS WILL BE FOR BLOCK 2, WHICH IS THE BOTTOM LEFT CORNER 8X8 BLOCK OF THE MB.<br>2'b00 - 1-8X8 SUB-BLOCK<br>2'b01 - 2-4X8 SUB-BLOCKS<br>2'b10 - 2-8X4 SUB-BLOCKS<br>2'b11 - 4-4X4 BLOCKS |

*Fig. 9B*

| | | | |
|---|---|---|---|
| 2 | 5:4 | SB_TYPE1 | THE SUB BLOCK TYPE, WHICH WILL BE 1 OF 4 TYPES. USED ONLY FOR MB TYPES OF 2'b11 (4-8X8 BLOCKS). THIS WILL BE FOR BLOCK 1, WHICH IS THE TOP RIGHT CORNER 8X8 BLOCK OF THE MB.<br>2'b00 - 1-8X8 SUB-BLOCK<br>2'b01 - 2-4X8 SUB-BLOCKS<br>2'b10 - 2-8X4 SUB-BLOCKS<br>2'b11 - 4-4X4 BLOCKS |
| 2 | 3:2 | SB_TYPE0 | THE SUB BLOCK TYPE, WHICH WILL BE 1 OF 4 TYPES. USED ONLY FOR MB TYPES OF 2'b11 (4-8X8 BLOCKS). THIS WILL BE FOR BLOCK 0, WHICH IS THE TOP LEFT CORNER 8X8 BLOCK OF THE MB.<br>2'b00 - 1-8X8 SUB-BLOCK<br>2'b01 - 2-4X8 SUB-BLOCKS<br>2'b10 - 2-8X4 SUB-BLOCKS<br>2'b11 - 4-4X4 BLOCKS |
| 2 | 1:0 | MB_TYPE | THE MACROBLOCK PARTITION, WILL BE ONE OF 4 MB TYPES<br>2'b00 - 1-16X16 BLOCK<br>2'b01 - 2-8X16 BLOCKS<br>2'b10 - 2-16X8 BLOCKS<br>2'b11 - 4-8X8 BLOCKS |
| 3 | 31:0 | LUMA_INPUT_DATA_ADDR | THE STARTING ADDRESS POINTER TO WHERE THE ME'S LUMA RESIDUE (OR SOURCE) DATA WILL BE READ FROM. |
| 4 | 31:0 | CR_INPUT_DATA_ADDR | THE STARTING ADDRESS POINTER TO WHERE THE ME'S CHROMA RED RESIDUAL (OR SOURCE) DATA WILL BE READ FROM. NOTE THAT CHROMA MB'S ARE PROCESSED WITH THIS PACKET FOR BOTH THE ENCODER AND THE DECODER. |

*Fig. 9C*

| | | | |
|---|---|---|---|
| 5 | 31:0 | CB_INPUT_DATA_ADDR | THE STARTING ADDRESS POINTER TO WHERE THE ME'S CHROMA BLUE RESIDUAL (OR SOURCE) DATA WILL BE READ FROM. NOTE THAT CHROMA MB'S ARE PROCESSED WITH THIS PACKET FOR BOTH THE ENCODER AND THE DECODER. /258 |
| 6 | 31:0 | LUMA_OUTPUT_DATA_ADDR | THE STARTING ADDRESS POINTER TO WHERE THE ME'S LUMA RECONSTRUCTED DATA WILL BE WRITTEN TO. /258 |
| 7 | 31:0 | CR_OUTPUT_DATA_ADDR | THE STARTING ADDRESS POINTER TO WHERE THE ME'S CHROMA RED RESIDUAL OR RECONSTRUCTED DATA WILL BE WRITTEN TO. NOTE THAT CHROMA MB'S ARE PROCESSED WITH THIS PACKET FOR BOTH THE ENCODER AND THE DECODER. /258 |
| 8 | 31:0 | CB_OUTPUT_DATA_ADDR | THE STARTING ADDRESS POINTER TO WHERE THE ME'S CHROMA BLUE RESIDUAL OR RECONSTRUCTED DATA WILL BE WRITTEN TO. NOTE THAT CHROMA MB'S ARE PROCESSED WITH THIS PACKET FOR BOTH THE ENCODER AND THE DECODER. /258 |
| 9-24 | 31:16 | MV_Y | Y MOTION VECTOR, 16 BITS SIGNED (16 TOTAL) /260 |
| 9-24 | 15:0 | MV_X | X MOTION VECTOR, 16 BITS SIGNED (16 TOTAL) /262 |
| 25 | 9 | DEC_DESC_HALT | HALT DESCRIPTOR CHAIN FLAG, MUST WRITE TO THE ME_START BIT TO RESUME. /264 |
| 25 | 8 | DEC_DESC_END | END OF DESCRIPTOR CHAIN INDICATION /266 |
| 25 | 7:0 | DEC_IN_NEXT_LEN | NEXT DESCRIPTOR LENGTH (IN BYTES) /268 |
| 26 | 31:0 | DEC_IN_NEXT_ADDR | NEXT DESCRIPTOR ADDRESS /270 |

*Fig. 9D*

MULTITHREADED DESCRIPTOR BASED MOTION ESTIMATION/COMPENSATION VIDEO ENCODING/DECODING

CROSS-REFERENCE TO RELATED APPLICATIONS

This application claims priority from U.S. Provisional Patent Application No. 61/007,068, filed on Dec. 11, 2007, and entitled "Multithreaded Descriptor Based Motion Estimation/Compensation Video Encoding/Decoding," the entirety of which is incorporated herein by reference

FIELD

The technology described in this patent document relates generally to video processing and more particularly to descriptor-based video motion estimation and compensation.

BACKGROUND

FIG. 1 is a block diagram of a typical video codec 30 having a main processor 32. The main processor 32 encodes an incoming video 34 by using intra-coded frames (I-Frames) 36 to generate one or more predictive-coded frames (P-Frames) 38. An I-Frame 36 is typically generated by compressing a single frame of the incoming video signal. The P-Frame 38 then provides more compression for subsequent frames by making reference to the data in the previous frame instead of compressing an entire frame of data. For instance, a P-Frame 38 may only include data indicating how the pixel data has changed from the previous frame (Δ Pixels) and one or more motion vectors to identify the motion between frames. Alternatively, the video codec 30 may function as a decoder, receiving I-frame 36 and P-Frame data to generate a video output 34.

In order to generate a P-Frame 38 during encoding operation, the main processor 32 typically compares 16×16 macroblocks of pixel data from a current frame 40 with 16×16 macroblocks of data from a previously generated frame of data, referred to as a reference frame 42. The main processor 32 attempts to find the best fit pixel match between each macroblock in the current frame 40 and each macroblock in the reference frame 42. In this way, the P-Frame only needs to include the small pixel difference (Δ Pixels) between the matched macroblocks and a motion vector to identify where the macroblock was located in the reference frame 42. An example of this process is further illustrated in FIGS. 2A and 2B.

FIG. 2A depicts an example macroblock 50 within a current frame 52 of pixel data. Also shown in FIG. 2A is a predicted motion vector (PMV) 54 that provides an estimate of where the macroblock 50 was likely located in the reference frame. As illustrated, a motion vector 54 typically points from a corner pixel of the current macroblock 50 to a corner pixel of the reference macroblock 56. Methods for calculating a predicted motion vector (PMV) 54 are known in the art and are beyond the scope of the instant application.

Based on the predicted motion vector (PMV) 54, a search area 60 is selected within the reference frame 62, as illustrated in FIG. 2B. As shown, the search area 60 may include all of the macroblocks surrounding the reference macroblock 56 identified by the predicted motion vector (PMV) 54. The current macroblock 50 is then compared with reference macroblocks at every pixel location within the search area 60 in order to identify the motion vector location within the search area 60 with the closest pixel match. This comparison is typically performed by calculating a sum of absolute differences ("SADs") for each motion vector location within the search area 60, and selecting the motion vector location with the lowest SAD as the best match.

The encoding procedures described above may be reversed as would be recognized by one skilled in the art, such that the video codec 30 may receive I-frame 36 and P-frame 38 input data and recreate a video output 34 via main processor 32 calculations. The calculations performed by a typical main processor to identify the best fit pixel match between a current macroblock and a search area in a reference frame as well as regeneration of video from stored I-frames and P-frames are often some of the most clock cycle, resource, and power consuming processes performed by a video codec.

SUMMARY

In accordance with the teachings provided herein, systems and methods are provided for calculating a motion vector for a macroblock between a reference frame and a current frame. The system may include a main processor configured to generate a linked list of variable length descriptor inputs that identify an operation to be performed on a macroblock specified in a descriptor. The system may also include a programmable video accelerator configured to receive the generated linked list of variable length descriptor inputs. The programmable video accelerator may be further configured to process each descriptor input in the linked list of variable length descriptor inputs in order by calculating a motion vector identifying motion of the macroblock specified in each descriptor from the reference frame to the current frame using the operation specified in the descriptor.

The main processor may be further configured to adaptively control the programmable video accelerator through manipulation of the linked list of descriptor inputs. The descriptor inputs may further include a search area in the reference frame in which the video accelerator is instructed to search. The video accelerator may be further configured to search the identified search area in the reference frame for the identified macroblock. The video accelerator may also be configured to function in a pipeline fashion such that the video accelerator retrieves a second macroblock identified by a subsequent descriptor input at the same time the reference frame is being searched for a first identified macroblock. The video accelerator may be configured to search the search area in the reference frame by comparing the retrieved macroblock to candidate blocks of the same size, where a best match has the smallest sum of absolute differences between the pixels of the macroblock and the candidate block. The video accelerator may be configured to calculate a motion vector according to the offset between the macroblock in the current frame and the best match in the reference frame in the horizontal and vertical directions.

The video accelerator may further include a memory and a motion estimation engine. The motion estimation engine may be configured to calculate movement of the macroblock from the reference frame to the current frame and to calculate the motion vector according to the calculated movement. The motion estimation engine may include an integer motion estimator for calculating macroblock movement on a whole pixel scale and a fractional motion estimator for calculating macroblock movement on a fractional pixel scale.

The descriptors in the linked list of descriptor inputs may be stored in non-contiguous locations within the memory. The descriptor inputs may also include a frame identifier, a horizontal location of the macroblock, a vertical location of the macroblock, a predicted motion vector, a next descriptor address, and a next descriptor length. The descriptor inputs may also include a halt descriptor chain flag, where an active halt descriptor chain flag stops the video accelerator until further instruction is received from the main processor. The descriptor inputs may further include a conditional statement, where the next descriptor address is determined based on an evaluation of the conditional statement by the video accelerator.

The video accelerator may be configured to retrieve the identified macroblock and search an identified search area in the reference frame for the identified macroblock. The descriptor input may include a conditional statement, and the video accelerator may be configured to function in a pipeline fashion such that the video accelerator retrieves a second identified macroblock at the same time the reference frame is being searched for a first identified macroblock. Processing of the second macroblock may be interruptible following an evaluation of the conditional statement by the video accelerator.

The system may further include a second programmable video accelerator configured to function in parallel with the video accelerator, where the second video accelerator is configured to operate on a subsequent descriptor input in the linked list of descriptor inputs. The second video accelerator may be configured to operate on the second macroblock at the same time the video accelerator operates on a first macroblock. The descriptor inputs may include a conditional statement, where the video accelerator and the second video accelerator are interconnected such that processing of the second macroblock by the second video accelerator is interruptible following an evaluation of the conditional statement by the video accelerator.

The descriptor inputs may further include an end of descriptor chain indicator. The main processor and the video accelerator may be fabricated on the same chip. A marcroblock may be 16 pixels by 16 pixels in size.

As another illustration, a system and method for calculating a motion vector for a macroblock between a reference frame and a current frame may include a memory configured to receive a linked list of variable length descriptor inputs. The descriptor inputs may include the macroblock for which the motion vector is to be calculated. The video accelerator may further include a motion estimation engine that may be configured to calculate a motion vector identifying motion of the identified macroblock from the reference frame to the current frame.

As a further illustration, a system and method for calculating a motion vector for a macroblock between a reference frame and a current frame may include receiving a linked list of variable length descriptor inputs from a main processor, where the descriptor inputs include the macroblock for which the motion vector is to be calculated. The system may retrieve the identified macroblock for the current frame from memory and search the reference frame for a location of a best match to the macroblock. A motion vector may be calculated based on a difference in location of the macroblock in the current frame to the location of the best match in the reference frame, and the calculated motion vector may be stored in memory.

As another illustration, a computer-implemented system and method of calculating a motion vector for a macroblock between a reference frame and a current frame, where the motion vector identifies motion of the macroblock from the reference frame to the current frame, may include providing a linked list of variable length descriptor inputs to a programmable video accelerator for computation of a motion vector identifying motion of the macroblock from the reference frame to the current frame, where the descriptor inputs include the macroblock for which the motion vector is to be calculated. A calculated motion vector may be received identifying motion of the macroblock from the reference frame to the current frame from the programmable video accelerator, and the received motion vector may be stored in a memory.

As a further illustration, a system and method for calculating a motion vector for a macroblock between a reference frame and a current frame may include means for receiving a linked list of variable length descriptor inputs from a main processor, where the descriptor inputs include the macroblock for which the motion vector is to be calculated. The system may further include means for retrieving the identified macroblock of the current frame from memory and means for searching the reference frame for a location of a best match to the macroblock. The system may also include means for calculating a motion vector based on a difference in location of the macroblock in the current frame to the location of the best match in the reference frame and means for storing the calculated motion vector in memory.

As another illustration, a system and method for generating a motion compensated frame may include receiving an address for a first descriptor of a linked list of variable length descriptors, where the linked list of variable length descriptors includes instructions for processing a plurality of macroblocks. The system and method may further retrieve the first descriptor from the address for the first descriptor. A source macroblock identified in the first descriptor may be retrieved, and the system and method may translate the source macroblock as directed by the first descriptor. The steps of retrieving a descriptor, retrieving a macroblock, and translating a macroblock may be repeated for the plurality of macroblocks described in the linked list of descriptors. A motion compensated frame may be generated from the translated macroblocks.

BRIEF DESCRIPTION OF THE DRAWINGS

FIGS. 6A and 6B are a table describing a structure for an encoder input descriptor.

FIGS. 8A and 8B are a table describing a structure for an encoder output packet.

FIGS. 9A, 9B, 9C and 9D are a table describing a structure for a decoder input descriptor.

DETAILED DESCRIPTION

Figure 1:
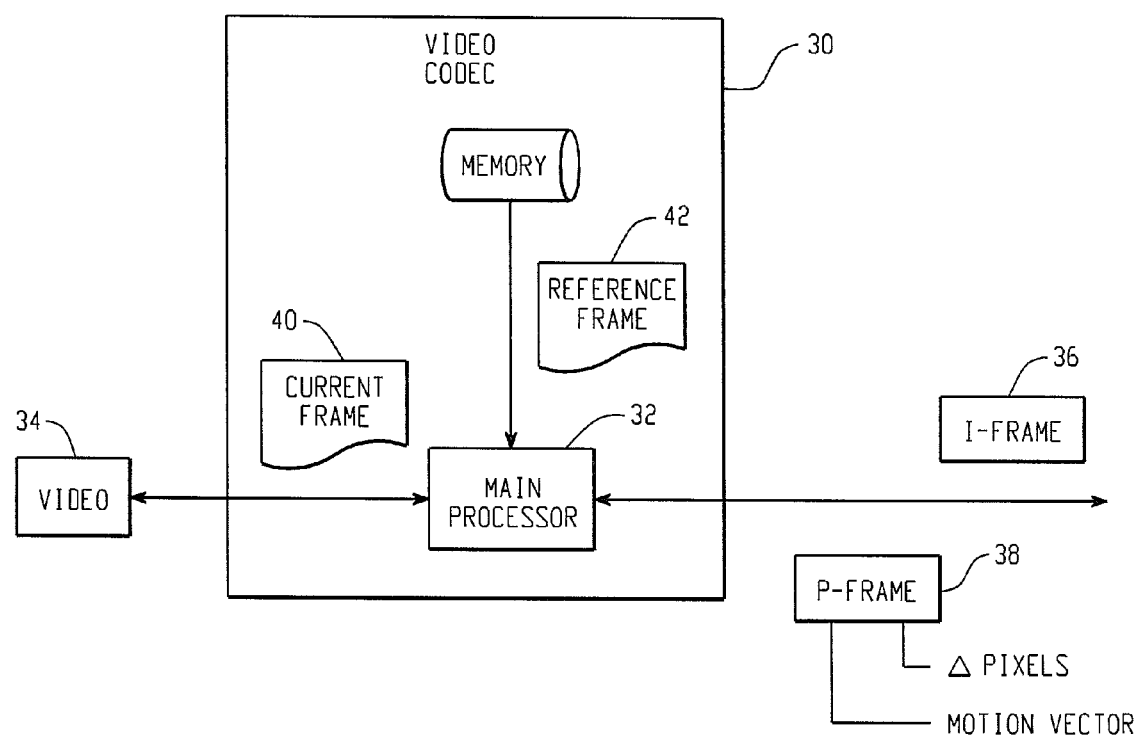
FIG. 1 is a block diagram of a typical video codec configuration.
Figure 2A:
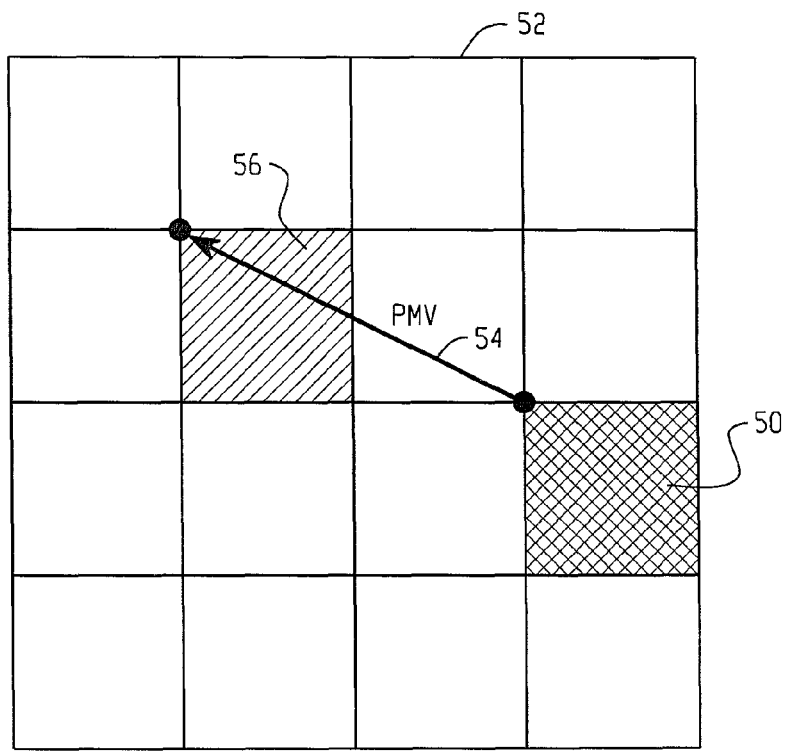
FIGS. 2A and 2B illustrate an example process for identifying a best fit pixel match between macroblocks in a current frame and macroblocks in a reference frame.
Figure 2B:
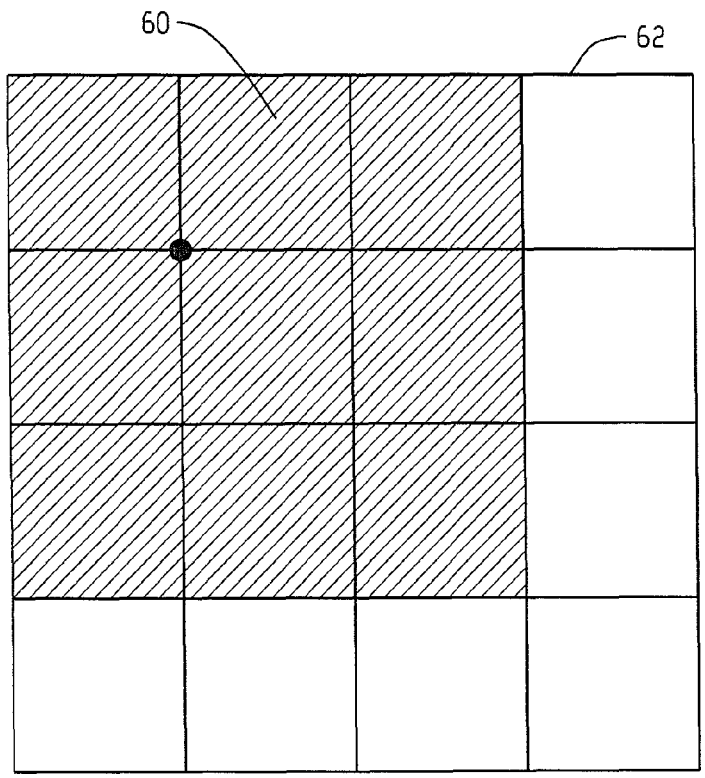
Figure 3:
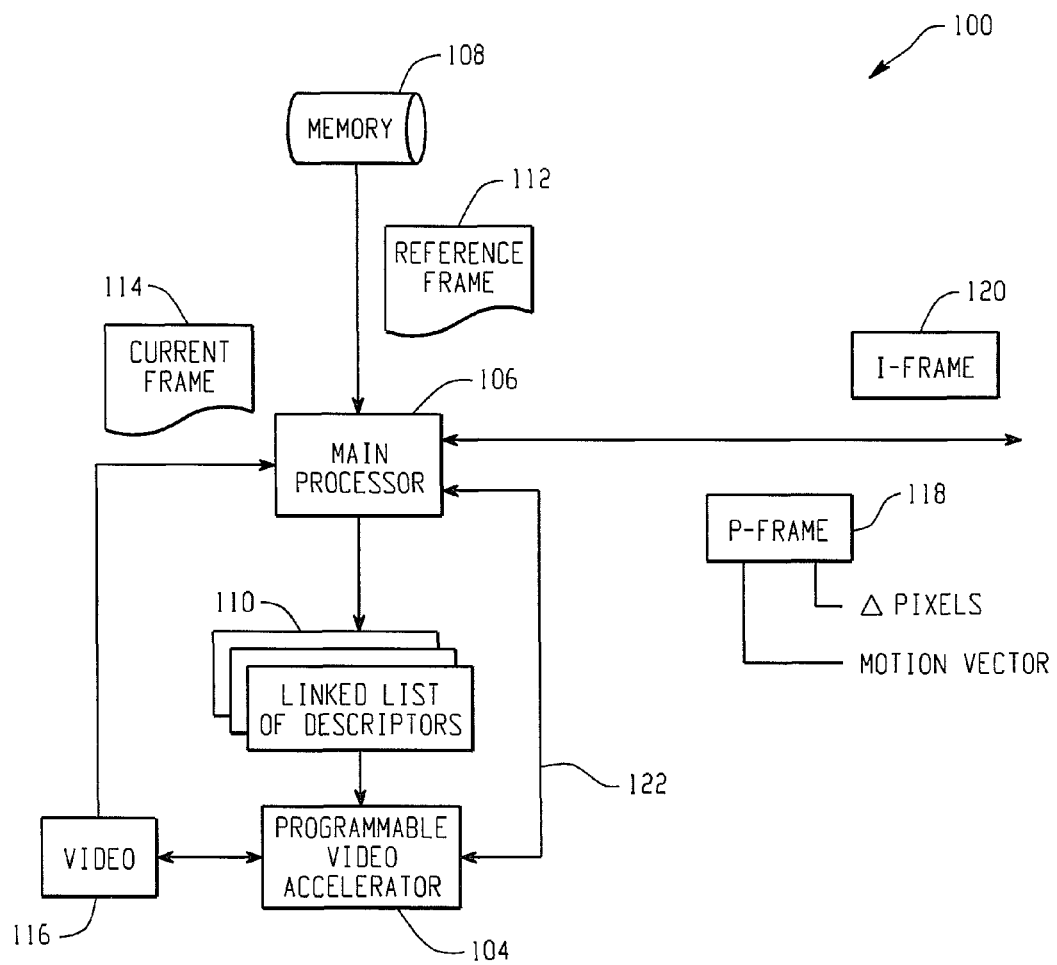
FIG. 3 is a block diagram illustrating a video codec that is responsive to a programmable video accelerator.

FIG. 3 is a block diagram illustrating a video codec 100 that is responsive to a programmable video accelerator 104. The video codec includes a main processor 106 that is responsive to a memory 108. The main processor 106 directs the programmable video accelerator 104 as to motion estimation/compensation decoding and encoding operations to be performed, including parameters for those operations, through a linked list of descriptor inputs 110. For example, the main processor 106 may direct the programmable video accelerator 104 to calculate a motion vector identifying motion of a macroblock from a specified reference frame 112 to a specified current frame 114. The programmable video accelerator 104 is responsive to a video 116 for accessing the identified reference frame 112 and current frame 114. The programmable video accelerator 104 generates the desired motion vector for use in encoding a P-Frame 118 that identifies pixel changes as compared to an I-Frame 120 and returns the generated motion vector as shown at 122. The video accelerator 104 may also output other data including MB Partition data including block types, residual data, and reconstructed data.

In a decoding operation, the main processor 106 may direct the programmable video accelerator 104 to generate a video output 116 from I-frame 120 and P-frame 118 inputs. The programmable video accelerator 104 may access the I-frame 120 and P-frame 118 data from memory 108. The programmable video accelerator 104 may then generate video output 116 by reading the accessed I-frame data 120 and using the macroblocks of the encoded P-frame data 118 in order to generate output video 116 frames (reconstructed frames). In addition to the output video 116, the video accelerator 104 may also output other data including reference frame data that may be used in decoding subsequent frames.

The programmable video accelerator 104 may or may not be fabricated on the same chip as the main processor 106. Additionally, stand alone encoders or decoders may be generated in addition to the described video codec 100 that take advantage of the programmable video accelerator features that are herein discussed.

The configuration of FIG. 3 enables the main processor 106 to offload much of the repetitive processing associated with motion compensated encoding and decoding while still retaining a high degree of controllability over the encoding and decoding processes. As described above, the use of the programmable video accelerator 104 enables the main processor 106 to offload motion vector calculations and video decoding operations, freeing the main processor 106 for other operations. This offloading is significant. For a 1080×1920 display utilizing 16×16 macroblocks, up to 8000 macroblocks may require motion vector estimation for a single frame. At up to 120 frames per second, the amount of processing from which the main processor 106 is relieved may be substantial.

While the use of a separate programmable video accelerator 104 frees the main processor 106 from repetitive calculations, the use of a linked list of input descriptors 110, which may be of variable size, enables the main processor 106 to retain significant adaptive control of video processing. The programmable video accelerator 104 is not required to only execute a fixed routine for every frame. Instead, the sequence of operations may be variable from frame to frame depending on video content. For example, the input descriptors may include a halt bit that enables the descriptor to instruct the accelerator 104 to stop processing at the end of the descriptor. The main processor 106 may then decide whether to continue the descriptor chain, branch to another descriptor chain, or add additional descriptors to the chain. The input descriptors may further include branch instructions encoded by the main processor 106 that set multiple branch addresses, one of which is selected based on the results of previous or current operations in the programmable video accelerator 104.

Figure 4:
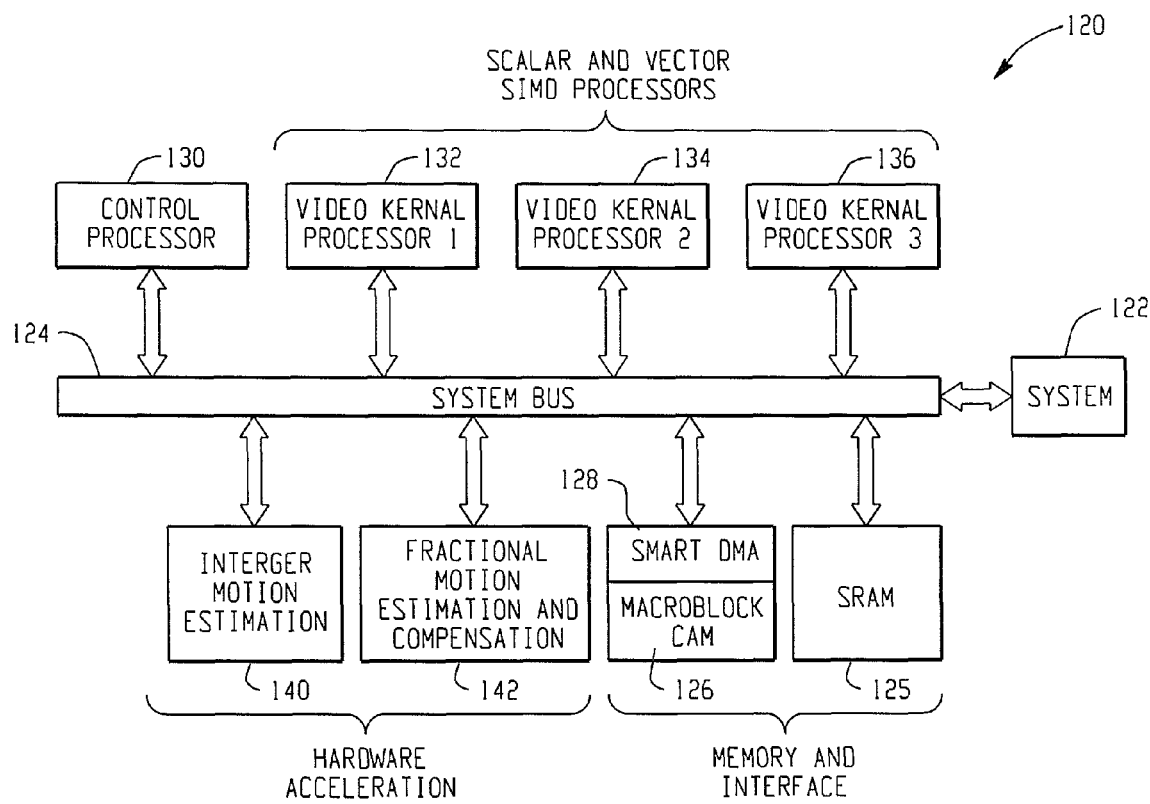
FIG. 4 is a block diagram illustrating components of a programmable video accelerator.

FIG. 4 is a block diagram illustrating components of a programmable video accelerator. The programmable video accelerator includes a system interface 122 providing a pathway for receiving input descriptors, video inputs, etc. and outputting video outputs, motion vectors, output packets, etc. The system interface 122 is responsive to the system bus 124. The system bus 124 provides pathways for communications within the programmable video accelerator 104 as well as connections to the system interface 122 for communications to entities outside the programmable video accelerator. The programmable video accelerator includes an internal SRAM memory 125 for general storage during operation. The programmable video accelerator further includes a macroblock CAM 126 configured to fetch macroblocks from system memory through a smart direct memory access module 128.

The programmable video accelerator also includes a control processor 130 configured to receive and interpret commands and to direct the other components of the programmable video accelerator 104 during operation. A plurality of video kernel processors 132, 134, 136 enable parallel, multi-threaded processing of video data. The kernel processors 132, 134, 136 may work in unison using a single instruction multiple data ("SIMD") configuration, or the kernel processors 132, 134, 136 may operate independently in a parallel, scalar fashion. The kernel processors 132, 134, 136 are responsive to the system bus 124 enabling communication among the kernel processors 132, 134, 136. This communication ability enables adaptive execution among the kernel processors 132, 134, 136 such that processing in a first kernel processor may effect a change or discontinuation of processing in one or more of the remaining kernel processors based on the results of processing in the first kernel processor.

The programmable video accelerator may also include hardware acceleration elements 140, 142. The hardware acceleration elements 140, 142 include dedicated hardware for high-speed processing of oft encountered video processing routines. The dedicated hardware acceleration elements 140, 142 not only offload certain repetitive processing from a main processor, but the dedicated hardware further speeds processing by utilizing hardware specially designed to address narrow, oft repeating processes. For example, the integer motion estimation element 140 contains hardware for fast computation of integer motion vectors identifying the number of whole pixels a macroblock moves from a reference frame to a current frame in a certain direction. Further, a fractional motion estimation and compensation element 142 contains hardware for quickly calculating any fractions of pixels a macroblock moves from a reference frame to a current frame in a direction.

The integer motion estimation element 140 and fractional motion estimation and compensation element 142 perform key processes of video compression and are used for encoding and decoding video frames. As described above, this encoding and decoding is known as interframe coding because the current frame is encoded or decoded based on another frame called the reference frame. This method differs from intraframe coding where the elements of a frame are encoded or decoded by a process that only considers elements of the current frame. In motion estimation, the current frame is divided into macroblocks (e.g., blocks 16×16 pixels in size). The macroblocks are processed one at a time. The current source macroblock is compared with the reference macroblocks over a search area determined by the source location and a predicted motion vector. The comparisons are made by calculating a sum of absolute differences between the source and reference pixels. The reference macroblock having the lowest sum of absolute difference value is deemed the best matching motion block. A vector pointing from the source macroblock to the best match reference macroblock, called the motion vector, is stored for each source macroblock. For decoding, the reference frame is used along with the motion vectors to reconstruct the source frame in a process called motion compensation. While the examples described herein deal mainly with interframe coding, it should be noted that many of these concepts may be similarly applied to other encoding schemes such as intraframe or bi-directional coding.

Figure 5:
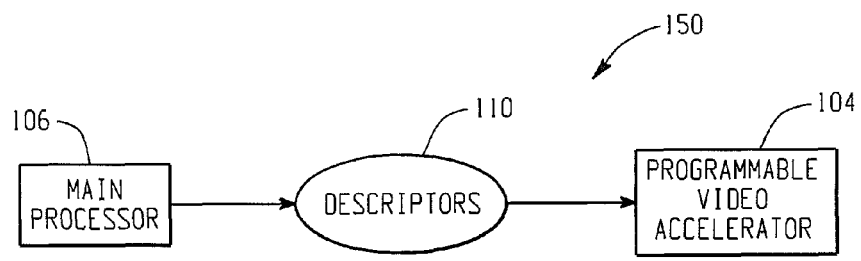
FIG. 5 is a flow diagram illustrating a flow of instructions from the main processor to the programmable video accelerator.

FIG. 5 is a flow diagram illustrating a flow of instructions from the main processor 106 to a programmable video accelerator 104 via a linked list of descriptor inputs 110. All of the programmed variables needed for performing motion estimation and compensation may be stored in memory as descriptors. Descriptors are blocks of memory where data is stored. The descriptors 110 are chained together as a linked list where the individual descriptors may be contiguous or fragmented in memory. Thus, the descriptors may be scattered in memory with no need to preallocate a fixed region of memory for instructions. Each macroblock descriptor 110 contains all of the information needed to describe the operation to be performed on the current macroblock. Descriptors are traditionally used for direct memory access ("DMA") data movement operations. However, the descriptors used in the current context are much more robust than simple block data movement vehicles and carry data and instructions such as operations to be completed, identification of macroblocks to be operated upon, identification of current frames, identification of reference frames, data destinations (e.g., for motion vectors and residue data), etc.

The main processor 106 creates the macroblock descriptor input chain 110, programs the starting descriptor address and length to the programmable video accelerator 104, and sets a "start" bit. The motion estimation/compensation processing may then be done completely in hardware without any interaction with the main processor 106 until the entire chain of descriptors 110 is processed by the programmable video accelerator 104 and/or an interrupt is asserted to a video accelerator controller (e.g., controller 130).

The use of a linked list of descriptor inputs 110 from the main processor 106 to the programmable video accelerator 104 offers benefits in flexibility, controllability, and efficiency. With reference to flexibility, the utilization of descriptors enables variable length inputs from the main processor 106 to the programmable video accelerator 104 to be utilized. Traditional dedicated hardware often utilizes fixed length input buffers. The use of linked lists of descriptors 110 enables variable length inputs minimizing memory waste for storage of unneeded parameter fields while offering longer fields and additional inputs when required.

Concerning controllability, the linked list structure of the input descriptors 110 enables the main processor 106 to maintain control of processing until the actual time of processing for a descriptor. Traditional dedicated hardware often utilized input buffers where inputs may not be changed once provided to the buffer. In contrast, the input descriptors 110 are housed in memory until processing. This enables the main processor 106 or the programmable video accelerator 104 to add, edit, or delete descriptors in the chain that have not yet been processed.

Edits to the input descriptor chain may be desirable in a number of circumstances. For example, if macroblocks near a macroblock identified in an upcoming descriptor all exhibit no motion or very similar motion in the same direction, a determination may be made that the motion vector for the identified macroblock should not be explicitly calculated but should instead be set to a value similar to surrounding macroblocks to save processing time. Conversely, if surrounding macroblocks in a current frame are all found to have very high levels of motion such that matches cannot be found in the reference frame, then a decision may be made that an I-Frame interjection is appropriate and motion vector calculation should not be processed for remaining macroblocks in that frame. Edits to the search area identified by the input descriptors may also be desirable based on motion vector calculations for previous macroblocks. If predicted motion vectors for prior macroblocks tend to be very accurate, then the search area may be tightened. In contrast, if prior search areas have tended to be too small to find a match for macroblocks in the current frame, identified search areas may be enlarged. Changes to the descriptor input chain may also be desirable based upon the status of a cycle budget, encoding bit budget, or other similar parameters that make modification to the descriptor input chain or branching to different descriptor chains desirable.

The use of a linked list of descriptor inputs has further significant efficiency benefits. A linked list of descriptor inputs may be created that is as long as memory allows. While this offers significant flexibility and controllability as described above, it also enables the main processor to accomplish large blocks of autonomous processing without concern for processing being run by the video accelerator. Because the linked list structure will continue to feed inputs to the video accelerator until the list is completed or instructed otherwise, the video accelerator may function for significant periods of time over a large number of descriptor inputs without requiring main processor attention.

FIGS. 6A and 6B are a table describing a structure for an encoder input descriptor. The example descriptor of FIGS. 6A and 6B has several fields of interest. The descriptor includes a Frame ID field 162 that contains an identifier of the frame upon which the accelerator is operating. This field not only helps to identify the results to be calculated. The Frame ID field 162 also instructs the video accelerator as to the reference frame to be fetched for searching. Fields 164 and 166 identify the (X,Y) location of the current macroblock in the frame. The input descriptor further includes a predicted motion vector as described by the (X,Y) components in fields 168 and 170. Fields 172, 174, 176 identify where in memory current frame data of the source video may be located. The descriptor also includes a halt descriptor chain flag 180 and end of descriptor chain indicator 182 as described above. Finally, the descriptor includes linked list information identifying the length of the next descriptor in the chain at 184 and the next descriptor address at 186.

Figure 7:
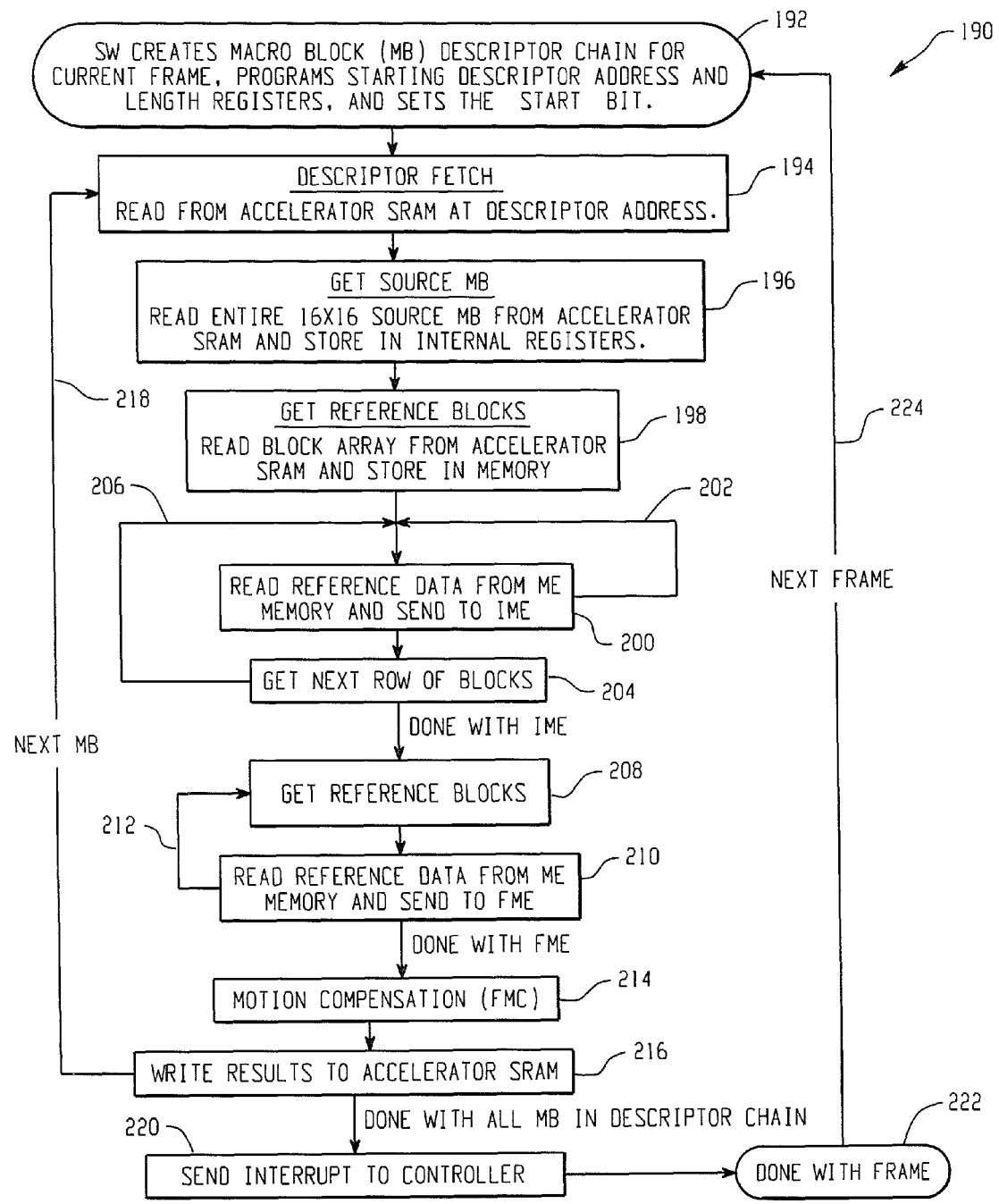
FIG. 7 is a flow diagram illustrating steps for an encoding operation that includes calculating a motion vector, residual data calculation, and reconstructed frame generation based on a received encoder input descriptor.

FIG. 7 is a flow diagram illustrating steps for calculating a motion vector based on a received encoder input descriptor. At 192, software creates a macroblock descriptor chain for the current frame, programs starting descriptor address and length registers in the video accelerator (e.g., programmable video accelerator 104), and sets the "start" bit of the video accelerator. Upon sensing the setting of the start bit, the video accelerator reads a first descriptor at 194. The video accelerator fetches the source macroblock from memory and stores the data associated with the source macroblock at 198. The video accelerator then fetches reference blocks to be searched and stores the reference block in motion estimation memory at 198. The video accelerator then performs search operations on the reference frame search area. At 200, reference data from the motion estimation is read and sent to the integer motion estimation element for processing. This process is repeated as shown at 202 for a row of reference frame data. Following completion of a row, a next row of blocks is fetched at 204, and the integer motion estimation process is repeated as shown at 206.

Following completion of integer motion estimation, fractional motion estimation may be executed. Reference blocks are fetched as shown at 208, and reference data is read from motion estimation memory and sent to the fractional motion estimation element at 210. This process is repeated as shown at 212 until fractional motion estimation is complete. Motion compensation may be performed at 214, and the results, which may include calculated motion vectors, associated residual data, and reconstructed frame data, are written to memory at 216. The process is repeated for each macroblock within a frame as shown at 218. Following completion of all macroblocks in the descriptor chain, an interrupt is sent to the video accelerator controller 220 informing the controller that the frame is complete 222. The process may then be repeated for the next frame as shown at 224.

The process illustrated in FIG. 7 may operate on a single macroblock at a time, or may function in a pipeline fashion. Operating in a pipeline fashion enables hardware to begin working on a next macroblock while different hardware operates on a first macroblock. For example, while integer motion estimation is being performed with respect to a first macroblock in steps 200-206, fetch operations 194-198 may be performed with respect to a second macroblock. Thus, once the first macroblock completes integer motion estimation, integer motion estimation may be started on the second macroblock without having to wait for the fetch operations to be performed. Pipeline processing enables the hiding of certain latencies within the process. Portions of the process may be responsive to other portions of the process to enable adaptive processing. For example if the results of calculations on a first macroblock result in a descriptor linked list branch to be performed, then upstream elements such as the fetch elements 194-198 may be instructed to flush their contacts to prepare for new fetch operations according to the executed branch instructions.

FIGS. 8A and 8B are a table describing a structure for an encoder output packet. This packet may be output following encoding procedures for a macroblock such as those described in FIG. 7. The output packet may include the (X,Y) location of the macroblock as shown at 232, 234. The output packet also includes the calculated motion vector in (X,Y) form as shown at fields 236 and 238. The output packet may further contain pointers to the locations of calculated residual data, and the output packet may contain information about the packet chain including an end of packet chain indication field 240, a next packet length field 242, and a next packet address field 244.

FIGS. 9A, 9B, 9C, and 9D are a table describing a structure for a decoder input descriptor. This descriptor may be supplied to the video accelerator during decode operations for generating viewable video from a set of I-Frame or P-Frame data and corresponding motion vectors and block partition information. Fields 252 identify the reference video frames to be used for the decode operation. The (X,Y) location of the macroblock in the reconstructed frame is identified in fields 254 and 256. Fields 258 identify the memory addresses for the source and destination data of the decode operation performed by the video accelerator. Fields 260 and 262 detail the P-Frame motion vector to be applied to the reference macroblock. Field 264 identifies a halt descriptor chain flag, and field 266 includes an end of descriptor chain indication as described above. Finally, the descriptor includes linked list chain information including the next descriptor length at 268 and the next descriptor address at 270.

Figure 10:
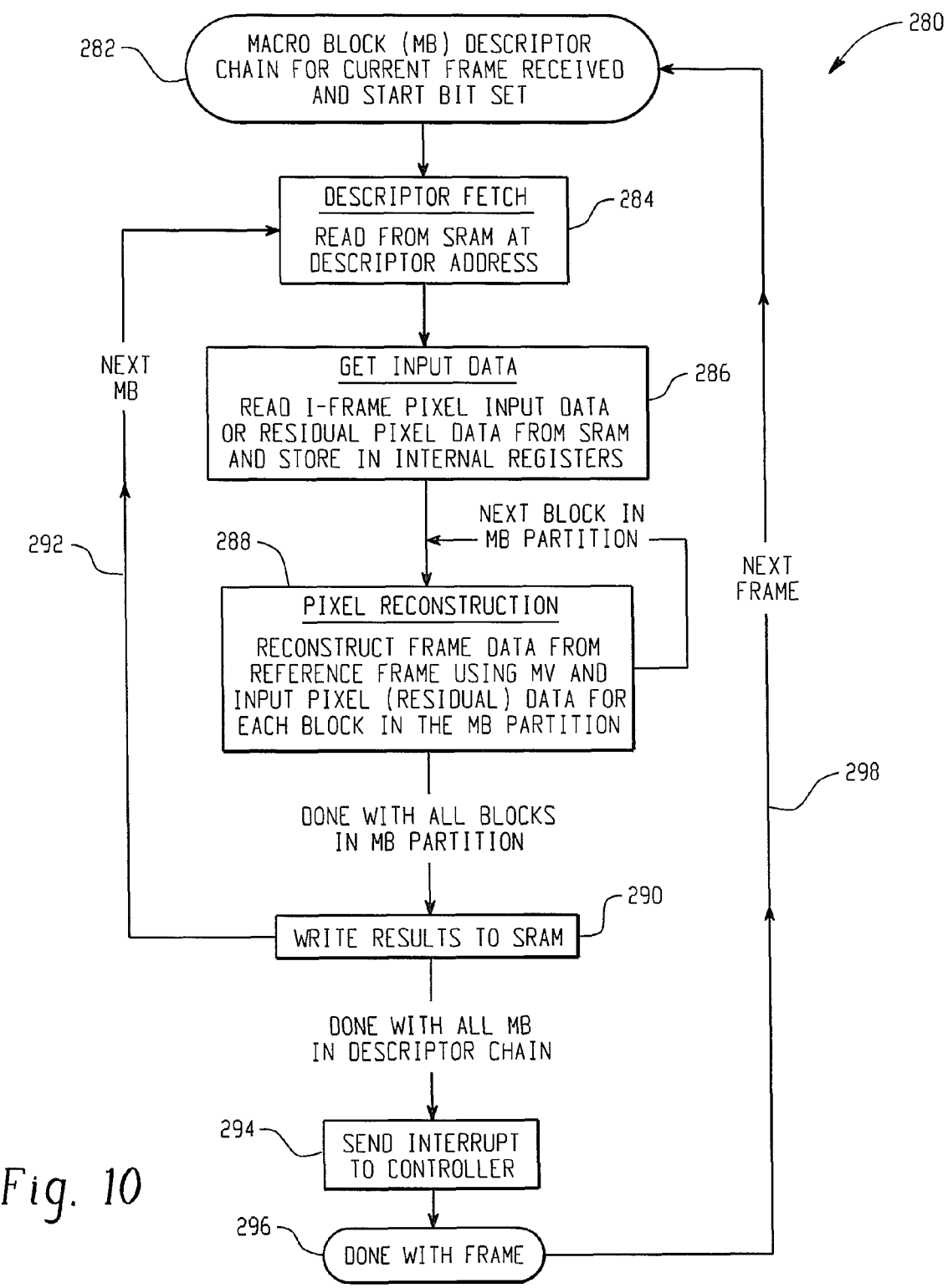
FIG. 10 is a flow diagram illustrating steps for generating a motion compensated frame based on a received decoder input descriptor.

FIG. 10 is a flow diagram illustrating steps for generating a motion compensated frame based on a received decoder input descriptor. At 282, a macroblock descriptor chain for the current frame is received and a start bit is set. The video accelerator fetches the first descriptor, which includes motion vectors and macroblock partition information, from SRAM at 284. The input data, I-Frame or P-frame (residual data), is then read from memory and stored in internal registers at 286. The input data is used along with the motion vectors for each block of the macroblock partition to generate a reconstructed macroblock from the current reference frame as illustrated at 288. The process at 288 is repeated until all blocks in the macroblock partition are done. The reconstructed macroblock is written to the video accelerator memory at 290, and may be output to the display and used as the reference frame in the decode operation for the next frame. The process is repeated for remaining macroblocks in the frame as shown at 292. Following calculations for all macroblocks included in the descriptor input chain, an interrupt may be sent to the video accelerator controller. Following completion of the frame 296, the process may be started again for the next frame as shown at 298 if required.

Figure 11:
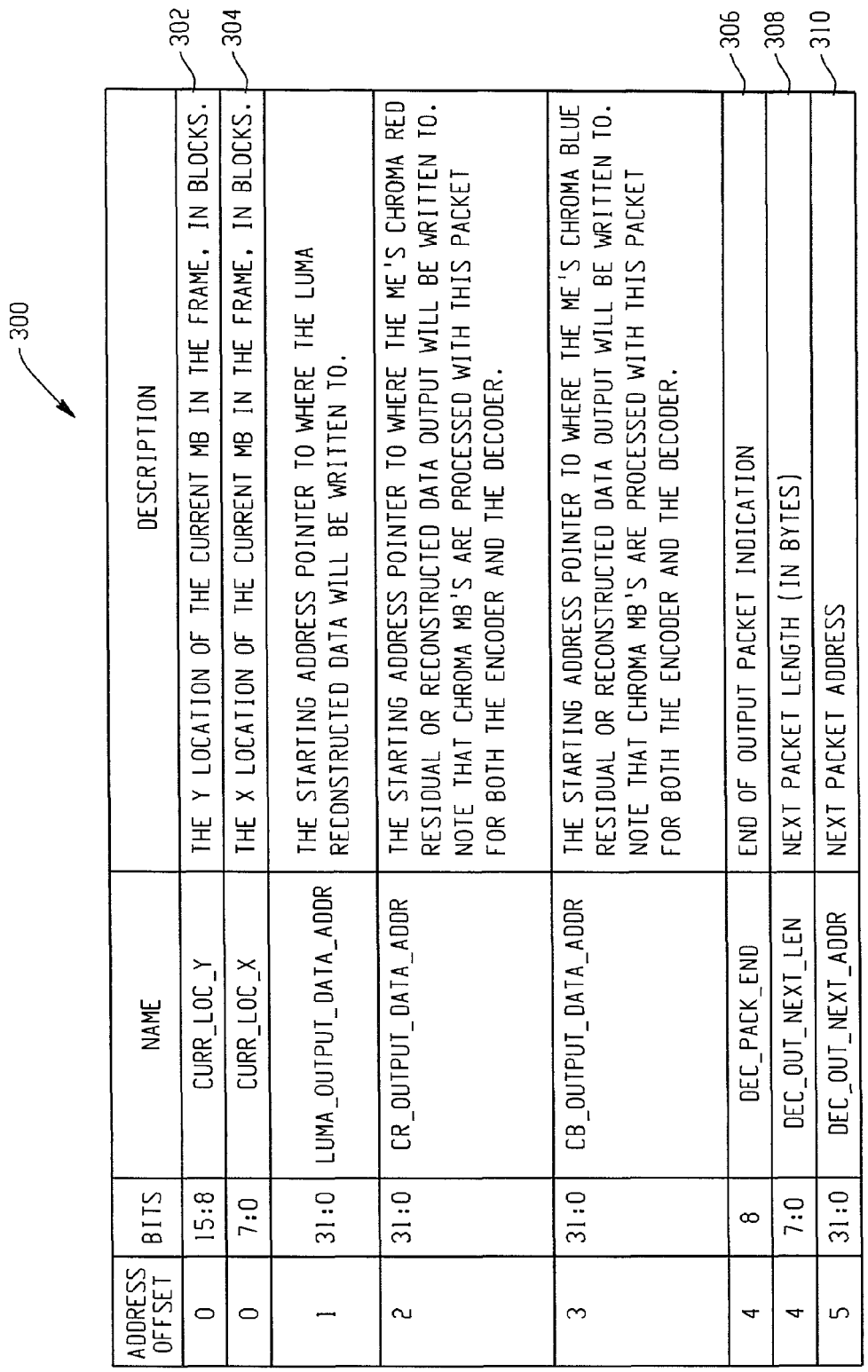
FIG. 11 is a table describing a structure for a decoder output packet.

FIG. 11 is a table describing a structure for a decoder output packet. The main information carried by a decode output packet is a pointer to the reconstructed frame data. Other data includes linked list management data such as the end of output packet indicator 306, a next packet length 308, and a next packet address.

Figure 12:
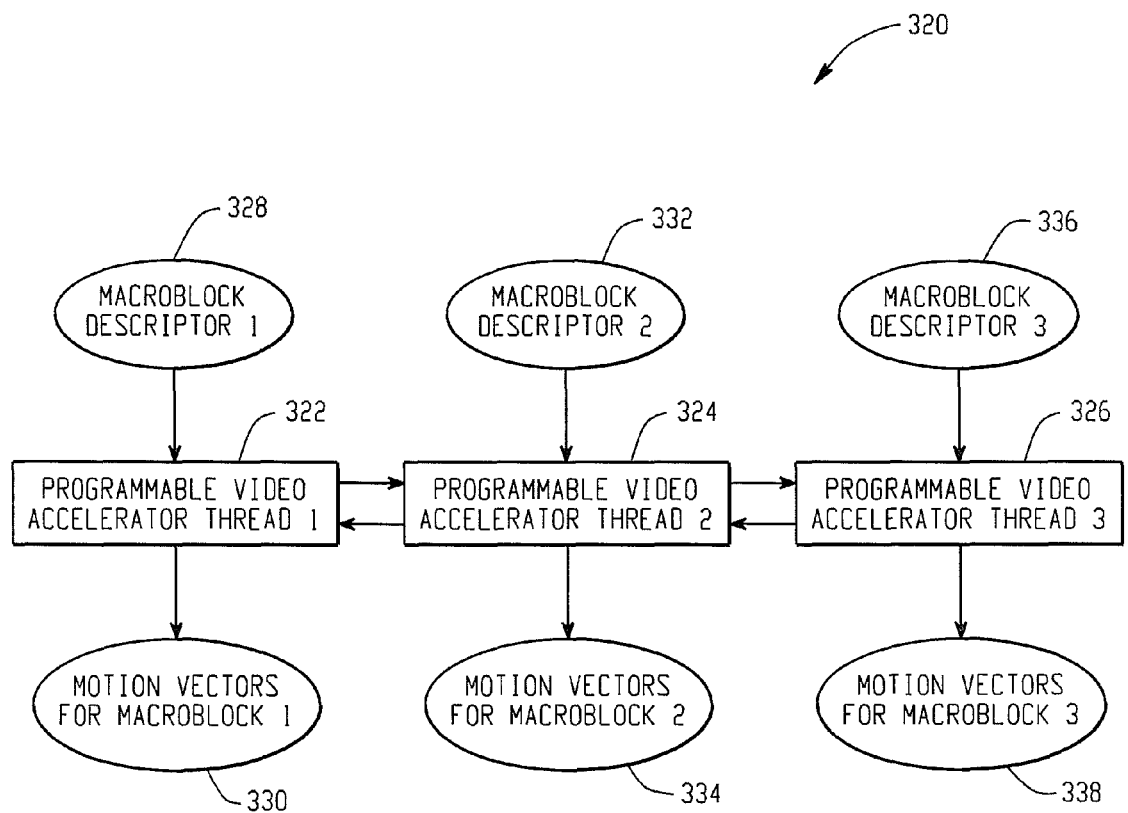
FIG. 12 is a block diagram illustrating a multi-threaded parallel programmable video accelerator configuration.

FIG. 12 is a block diagram illustrating a multi-threaded parallel programmable video accelerator configuration. This multi-threaded architecture enables processing on a plurality of macroblocks at the same time. Calculations on multiple macroblocks may be done in unison via a SIMD format, or the threads may work independently on a next macroblock requiring processing in the linked list of descriptor inputs. An example multi-threaded architecture includes three programmable video accelerator threads 322, 324, 326. The three video accelerator threads 322, 324, 326 are interconnected, such as via an internal bus, so that data and commands may be passed and shared among the threads 322, 324, 326. Passed commands may include changes in the linked list of descriptor inputs via branch or halt instructions as described above as well as notifications of resource contentions or other low level processing notifications.

The first video accelerator thread receives a first macroblock descriptor 328 and processes the macroblock associated with the descriptor to calculate a first set of motion vectors 330. The second video accelerator thread 324 receives a second macroblock descriptor 332 and processes the associated macroblock to generate a second set of motion vectors 334. Similarly, the third video accelerator thread 326 receives a third input descriptor 336. The third video accelerator thread 326 calculates a set of motion vectors 338 for the macroblock identified by the third input descriptor 336. The multi-threaded architecture depicted in FIG. 12 is not limited to motion vector calculation. The multi-threaded architecture may be used for a number of other processing such as motion compensation in video regeneration, etc. The video accelerators 322, 324, 326 may utilize other outside elements such as dedicated motion estimation hardware in making calculations.

One or more of method steps described above can be performed by one or more programmable processors executing a computer program to perform functions by operating on input data and generating output. Generally, the invention can take the form of an entirely hardware embodiment, an entirely software embodiment or an embodiment containing both hardware and software elements. In one implementation, the invention is implemented in software, which includes but is not limited to firmware, resident software, microcode, etc. Furthermore, the invention can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read only memory (ROM), a rigid magnetic disk and an optical disk. Current examples of optical disks include compact disk-read only memory (CD-ROM), compact disk-read/write (CD-R/W) and DVD.

This written description uses examples to disclose the invention, including the best mode, and also to enable a person skilled in the art to make and use the invention. The patentable scope of the invention may include other examples that occur to those skilled in the art.

It is claimed:

1. A system for calculating a motion vector for a macroblock between a reference frame and a current frame, the system comprising:
   a main processor to generate a linked list of variable length descriptor inputs, each descriptor input specifying an operation to be performed on a macroblock and comprising a frame identifier; a horizontal location of the macroblock; a vertical location of the macroblock; a predicted motion vector; a next descriptor address; and a next descriptor length; and
   a programmable video accelerator to receive the linked list of variable length descriptor inputs,
   the programmable video accelerator further to process in order each descriptor input in the linked list of variable length descriptor inputs by:
      calculating a motion vector identifying motion of the macroblock specified in the descriptor input from the reference frame to the current frame using the operation specified in the descriptor input.

2. The system of claim 1, wherein the main processor adaptively controls the programmable video accelerator through manipulation of the linked list of variable length descriptor inputs.

3. The system of claim 1, wherein the programmable video accelerator is configured to process each descriptor input in the generated linked list of variable length descriptor inputs without further input from the main processor.

4. The system of claim 1, wherein the each descriptor input further includes a search area in the reference frame in which the programmable video accelerator is instructed to search the reference frame.

5. The system of claim 4, wherein:
   the programmable video accelerator is configured to retrieve the identified macroblock, and
   the programmable video accelerator is further configured to search the identified search area in the reference frame for the identified macroblock.

6. The system of claim 5, wherein the programmable video accelerator is configured to function in a pipeline fashion such that the programmable video accelerator retrieves a second macroblock identified by a subsequent descriptor input in the linked list of variable length descriptor inputs at a same time the reference frame is being searched for a first identified macroblock.

7. The system of claim 5, wherein the programmable video accelerator is configured to search the search area in the reference frame by comparing the retrieved macroblock to candidate blocks of the same size as the macroblock in the search area;
   wherein a best match has the smallest sum of absolute differences between pixels of the macroblock and pixels of the candidate block.

8. The system of claim 7, wherein the programmable video accelerator is configured to calculate a motion vector according to an offset between the macroblock in the current frame and the best match in the reference frame in horizontal and vertical directions.

9. The system of claim 1, wherein the programmable video accelerator further comprises:
   a memory; and
   a motion estimation engine;
   wherein the motion estimation engine is configured to calculate movement of the macroblock from the reference frame to the current frame, the motion estimation engine further configured to calculate the motion vector according to the calculated movement.

10. The system of claim 9, wherein the motion estimation engine comprises:
    an integer motion estimator for calculating macroblock movement on a whole pixel scale; and
    a fractional motion estimator for calculating macroblock movement on a fractional pixel scale.

11. The system of claim 1, wherein the programmable video accelerator further comprises:
    a memory;
    wherein at least two descriptors in the linked list of descriptor inputs are stored in non-contiguous locations within the memory.

12. The system of claim 1, wherein a descriptor input in the linked list of variable length descriptor inputs further comprises a halt descriptor chain flag;
    wherein an active halt descriptor chain flag stops the programmable video accelerator until further instruction is received from the main processor.

13. The system of claim 1, wherein a descriptor input in the linked list of variable length descriptor inputs further comprises a conditional statement;
    wherein a next descriptor address is determined based on an evaluation of the conditional statement by the programmable video accelerator.

14. The system of claim 1, further comprising:
    a second programmable video accelerator configured to function in parallel with the programmable video accelerator, the second video accelerator configured to operate on a subsequent descriptor input in the linked list of variable length descriptor inputs;
    wherein the second programmable video accelerator operates on a second macroblock identified by the subsequent descriptor input at a same time the programmable video accelerator operates on a first macroblock.

15. The system of claim 1, wherein the main processor and the programmable video accelerator are fabricated on a same chip.

16. The system of claim 1, wherein the macroblock is 16 pixels by 16 pixels in size.

17. The system of claim 1, wherein the programmable video accelerator is further configured to calculate residual data associated with the retrieved macroblock of the current frame.

18. A method of calculating a motion vector for a macroblock between a reference frame and a current frame, the method comprising:
   receiving at a programmable video accelerator a linked list of variable length descriptor inputs, each descriptor input specifying an operation to be performed on a macroblock and comprising a frame identifier; a horizontal location of the macroblock; a vertical location of the macroblock; a predicted motion vector; a next descriptor address; and a next descriptor length; and
   processing, in order, each descriptor input in the linked list of variable length descriptor inputs by
   calculating a motion vector identifying motion of the macroblock specified in the descriptor input from the reference frame to the current frame using the operation specified in the descriptor input.

19. The method of claim 18, further comprising:
   controlling the programmable video accelerator through manipulation of the linked list of variable length descriptor inputs.

20. The method of claim 18, wherein the each descriptor input further includes a search area in the reference frame in which the programmable video accelerator is instructed to search the reference frame.

21. The method of claim 20, further comprising:
   retrieving the identified macroblock, and
   searching the identified search area in the reference frame for the identified macroblock.

22. The method of claim 21, wherein the programmable video accelerator is configured to function in a pipeline fashion such that the programmable video accelerator retrieves a second macroblock identified by a subsequent descriptor input in the linked list of variable length descriptor inputs at a same time the reference frame is being searched for a first identified macroblock.

23. The method of claim 21, wherein the search area in the reference frame is searched by comparing the retrieved macroblock to candidate blocks of the same size as the macroblock in the search area;
   wherein a best match has the smallest sum of absolute differences between pixels of the macroblock and pixels of the candidate block.

24. The system of claim 23, further comprising:
   calculating a motion vector according to an offset between the macroblock in the current frame and the best match in the reference frame in horizontal and vertical directions.

25. The method of claim 18, wherein a descriptor input in the linked list of variable length descriptor inputs further comprises a halt descriptor chain flag;
   wherein an active halt descriptor chain flag stops the programmable video accelerator until further instruction is received.

26. The method of claim 18, wherein a descriptor input in the linked list of variable length descriptor inputs further comprises a conditional statement;
   wherein a next descriptor address is determined based on an evaluation of the conditional statement by the programmable video accelerator.

27. The method of claim 18, wherein the macroblock is 16 pixels by 16 pixels in size.

28. The method of claim 18, further comprising:
   calculating residual data associated with the retrieved macroblock of the current frame.

* * * * *